US010073287B2

(12) United States Patent
Ide

(10) Patent No.: US 10,073,287 B2
(45) Date of Patent: Sep. 11, 2018

(54) DISPLAY DEVICE

(71) Applicant: Japan Display Inc., Tokyo (JP)

(72) Inventor: Tatsuya Ide, Tokyo (JP)

(73) Assignee: Japan Display Inc., Tokyo (JP)

( * ) Notice: Subject to any disclaimer, the term of this patent is extended or adjusted under 35 U.S.C. 154(b) by 79 days.

(21) Appl. No.: 15/166,353

(22) Filed: May 27, 2016

(65) Prior Publication Data

US 2016/0377899 A1  Dec. 29, 2016

(30) Foreign Application Priority Data

Jun. 26, 2015 (JP) ................. 2015-128632

(51) Int. Cl.
| | | |
|---|---|---|
| *G06F 3/041* | (2006.01) | |
| *G02F 1/1333* | (2006.01) | |
| *G02F 1/1335* | (2006.01) | |
| *G02F 1/1343* | (2006.01) | |
| *G02F 1/1345* | (2006.01) | |
| *G02F 1/1368* | (2006.01) | |
| *G06F 3/044* | (2006.01) | |

(52) U.S. Cl.
CPC ........ *G02F 1/13338* (2013.01); *G02F 1/1368* (2013.01); *G02F 1/13452* (2013.01); *G02F 1/13454* (2013.01); *G02F 1/133345* (2013.01); *G02F 1/133528* (2013.01); *G02F 1/134309* (2013.01); *G06F 3/044* (2013.01); *G06F 3/0412* (2013.01); *G02F 2001/133302* (2013.01); *G06F 2203/04107* (2013.01)

(58) Field of Classification Search
CPC .................. G06F 3/044; G06F 3/0412; G06F 2203/04107; G02F 1/13338; G02F 1/13454; G02F 1/1368; G02F 1/13452; G02F 1/134309; G02F 1/133528; G02F 1/133345; G02F 2001/133302

See application file for complete search history.

(56) References Cited

U.S. PATENT DOCUMENTS

| | | | | |
|---|---|---|---|---|
| 2003/0102424 A1* | 6/2003 | Izumi | ................ | H01L 27/14603 250/208.1 |
| 2011/0285640 A1* | 11/2011 | Park | .................... | G02F 1/13338 345/173 |
| 2013/0033450 A1* | 2/2013 | Coulson | .................. | G06F 3/044 345/174 |

FOREIGN PATENT DOCUMENTS

JP        2011-70092 A     4/2011

\* cited by examiner

*Primary Examiner* — Matthew Sim
(74) *Attorney, Agent, or Firm* — Typha IP LLC

(57) ABSTRACT

Provided is a display device including a touch panel, the display device having a function of being suppressed from being charged with electricity. A display device including a touch panel includes a detection electrode of the touch panel, the detection electrode being provided on one surface of a display cell; a protective layer covering the detection electrode; and an optical film bonded to the protective layer, the optical film having an external shape smaller than that of the protective layer. The protective layer may be a single layer substantially formed of a conductive polymer and an insulating material, or may have a stack structure including an insulating layer and a conductive layer.

7 Claims, 14 Drawing Sheets

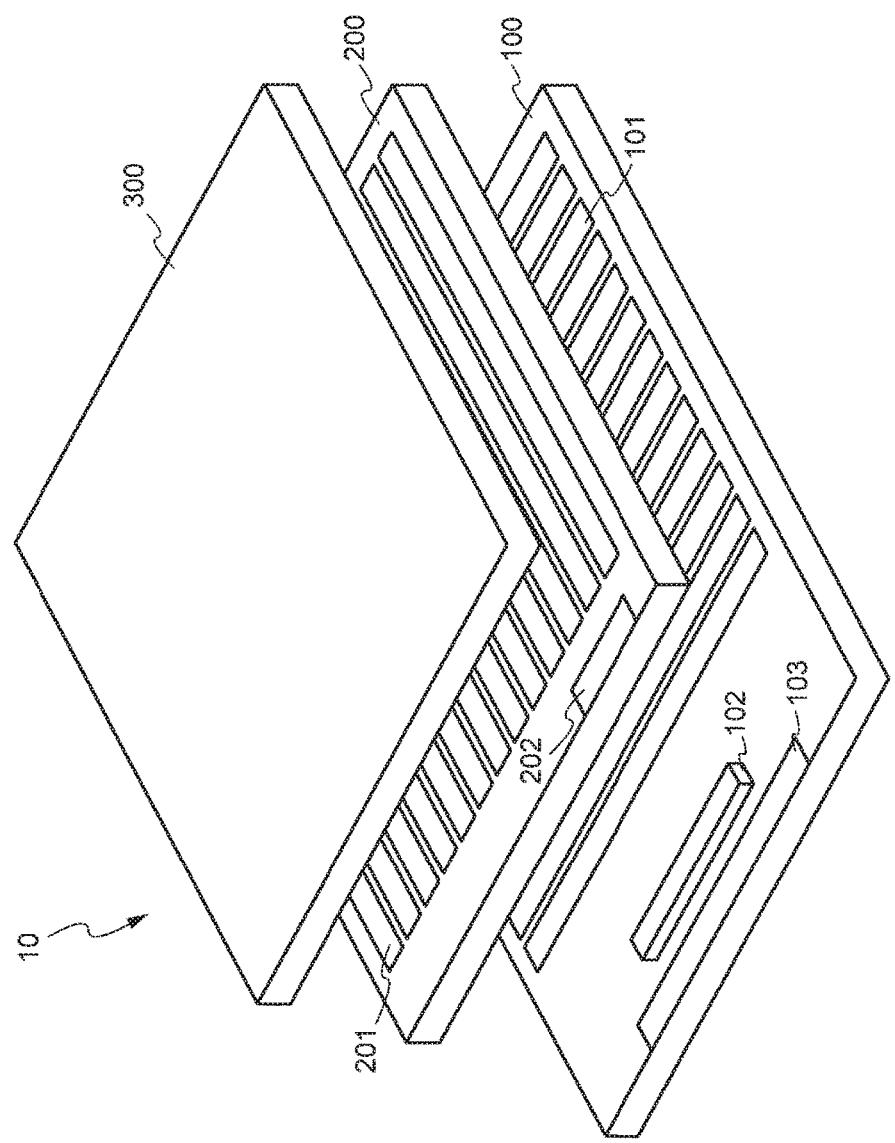

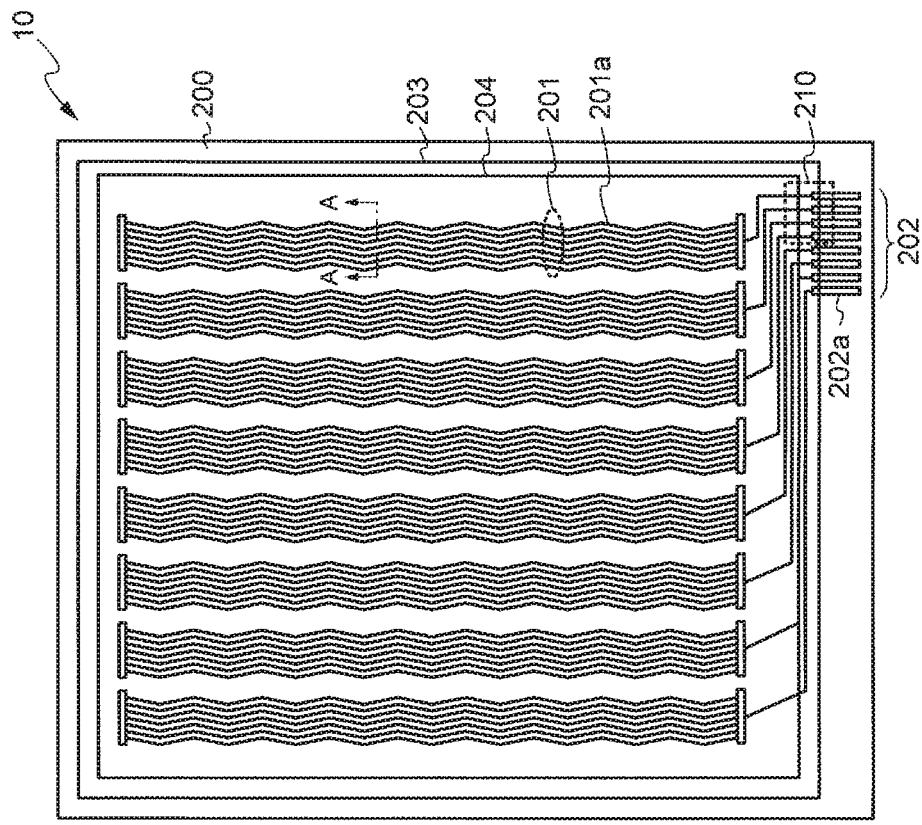

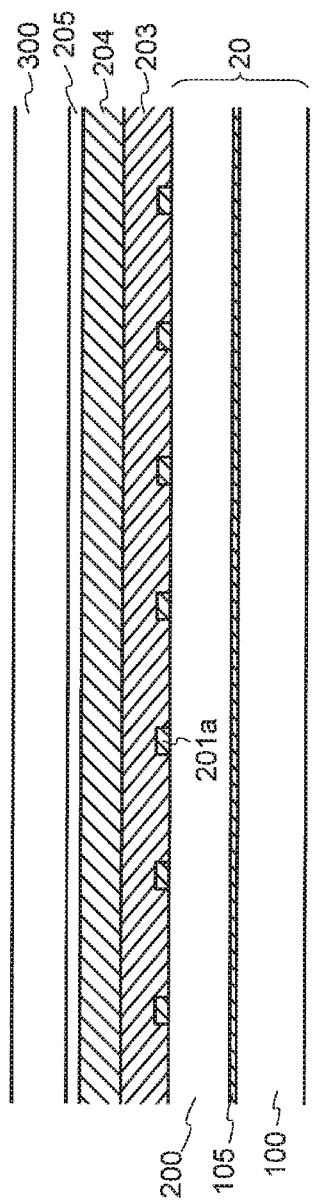

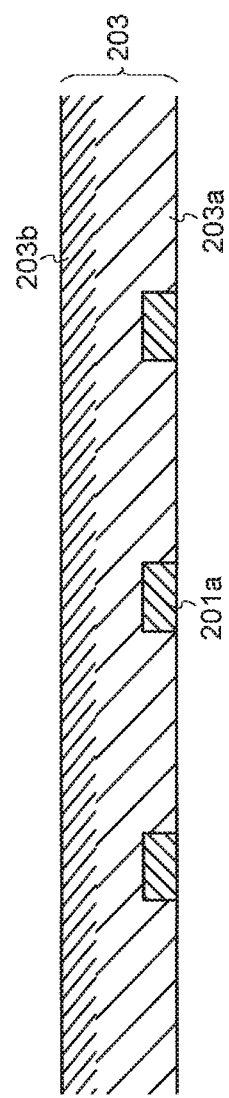

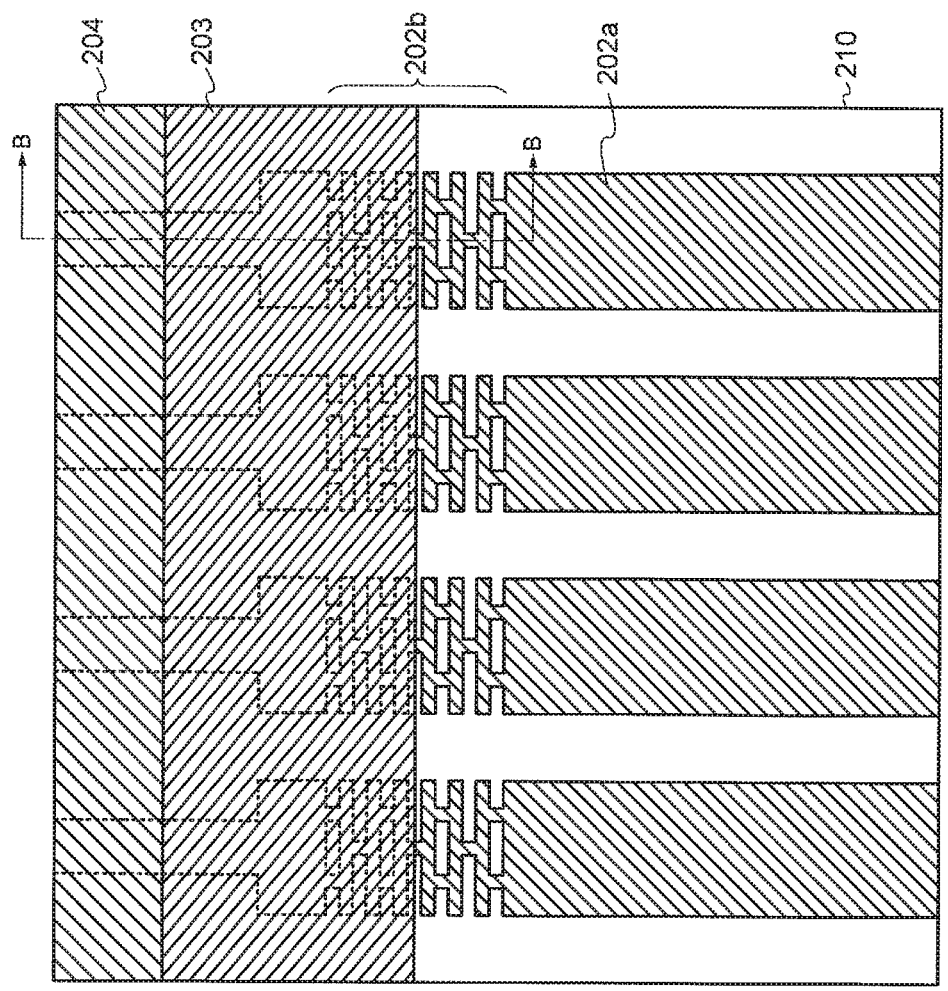

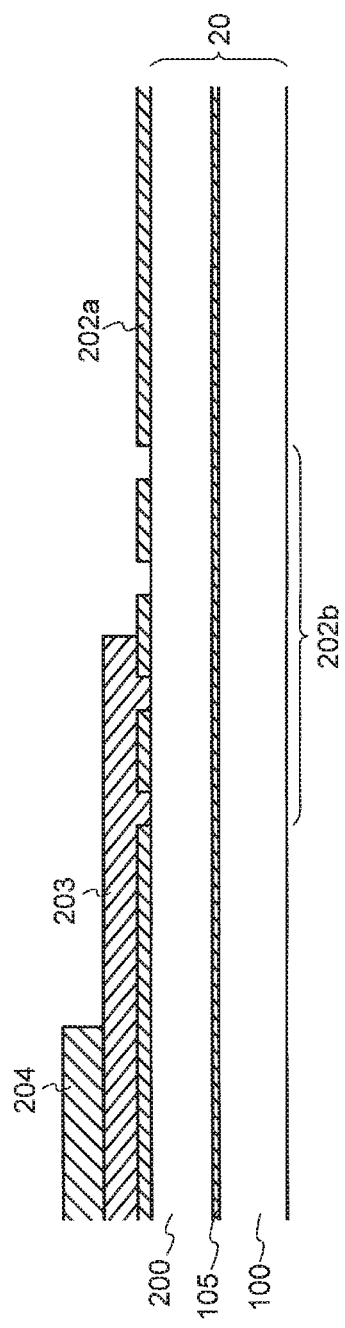

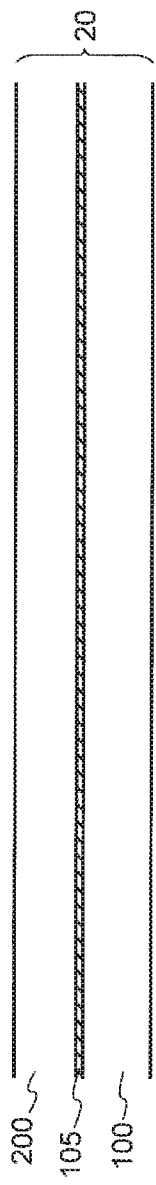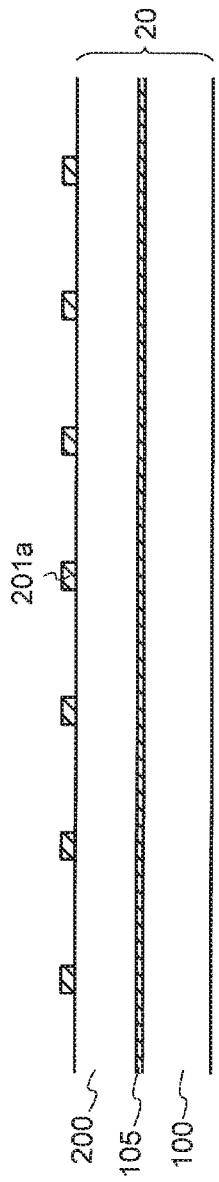

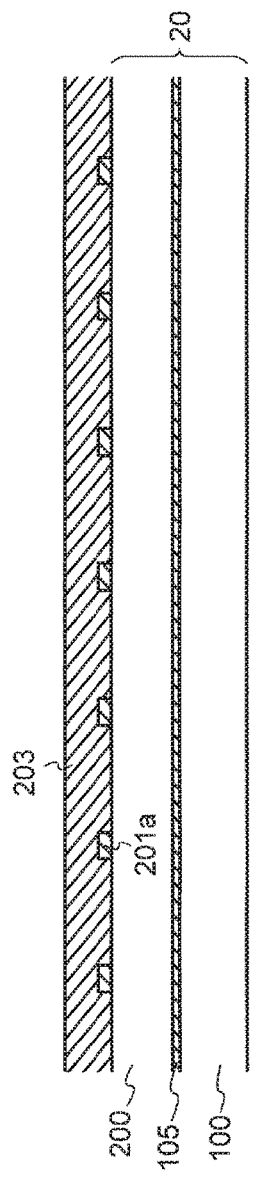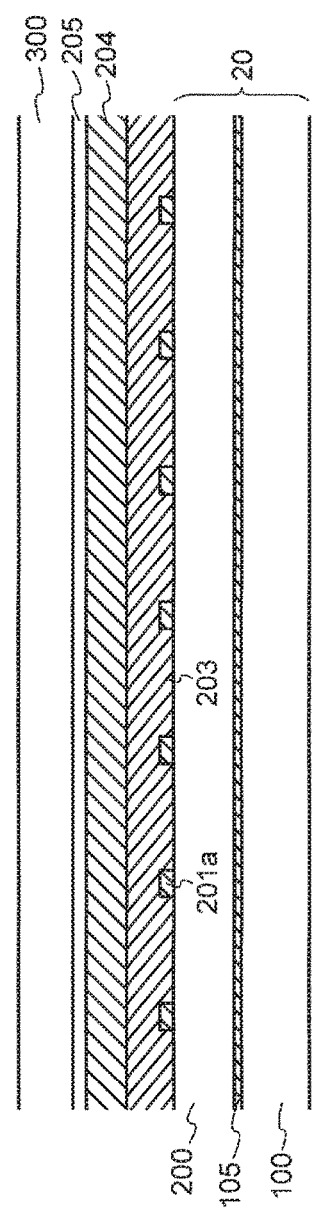

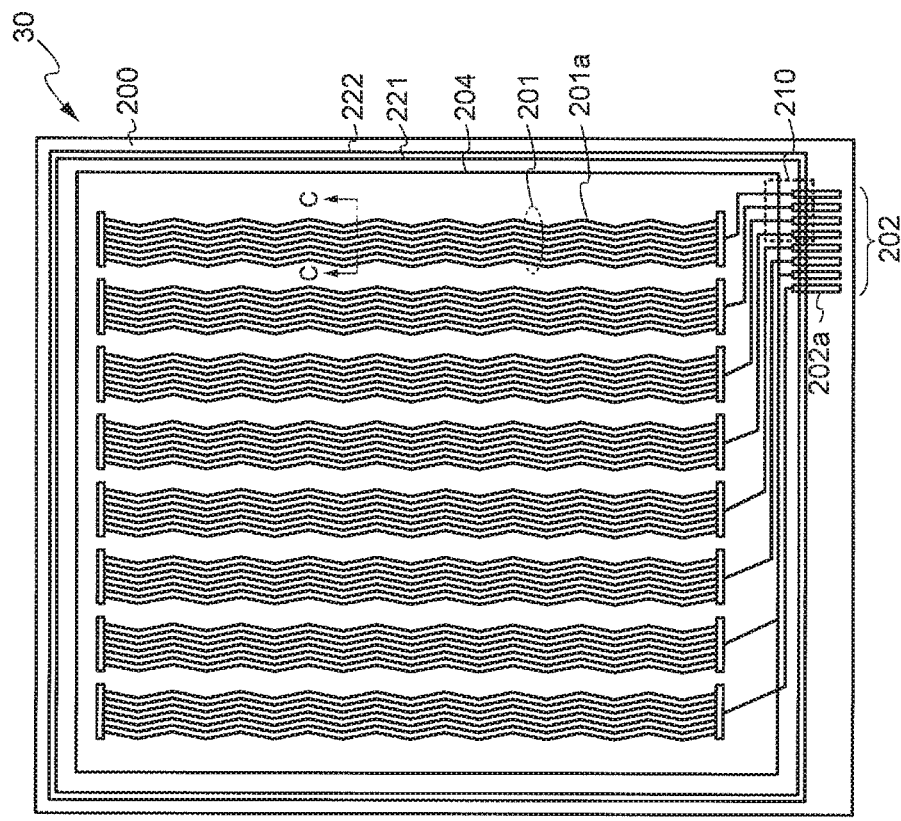

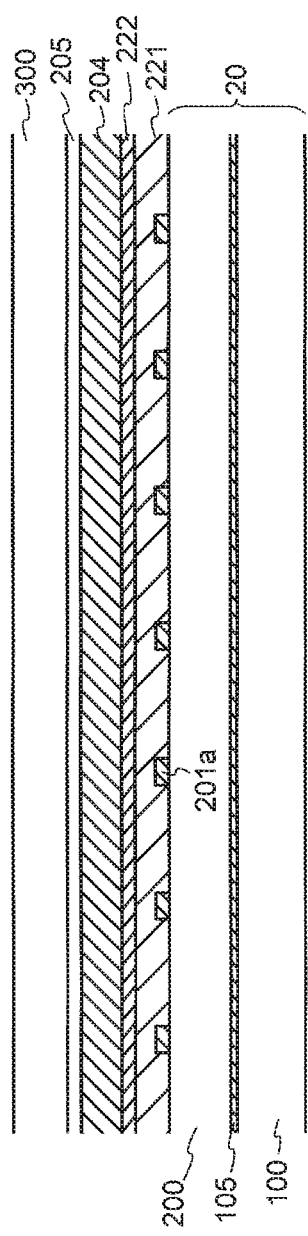

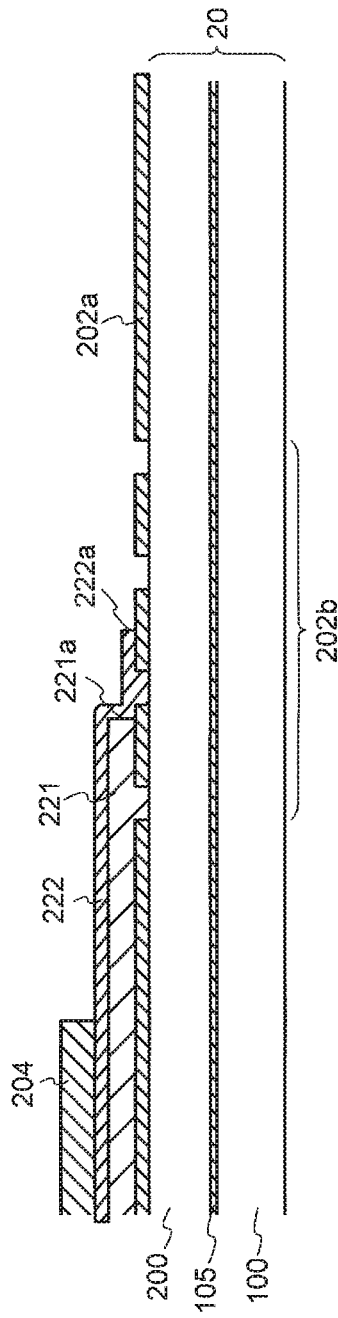

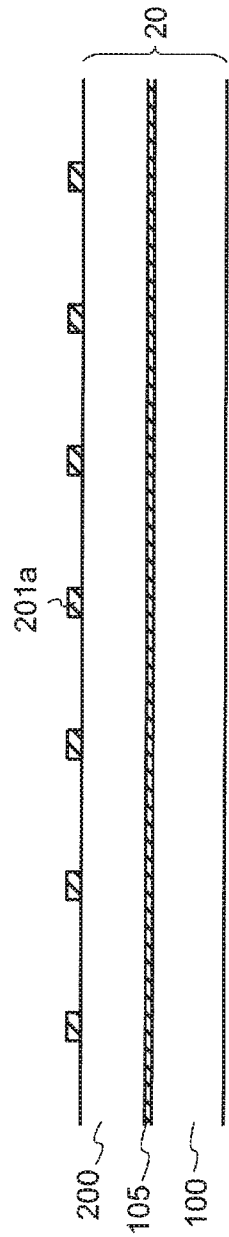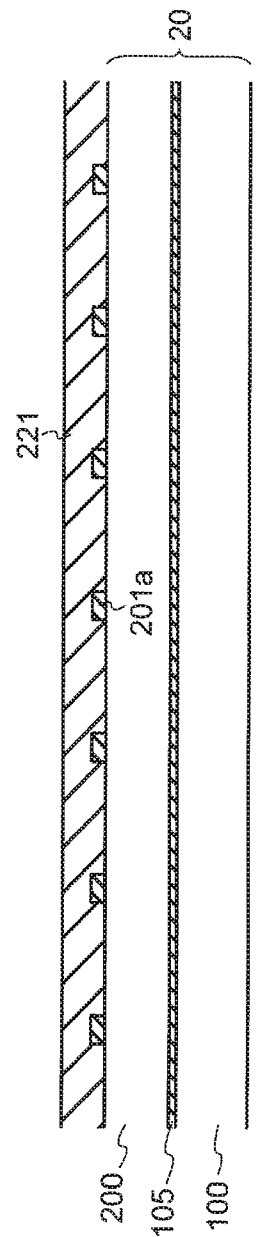

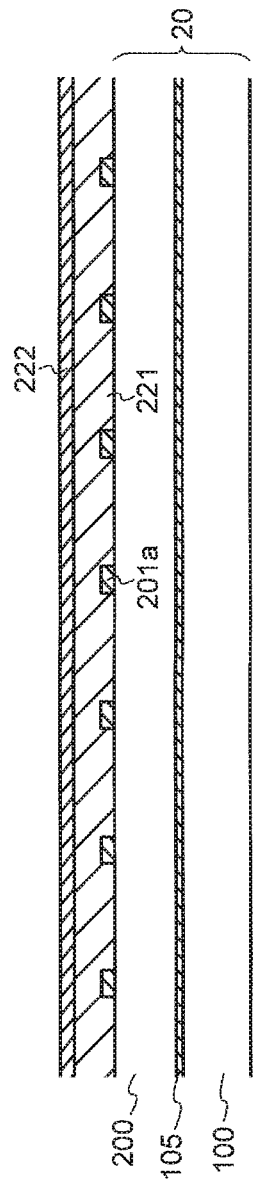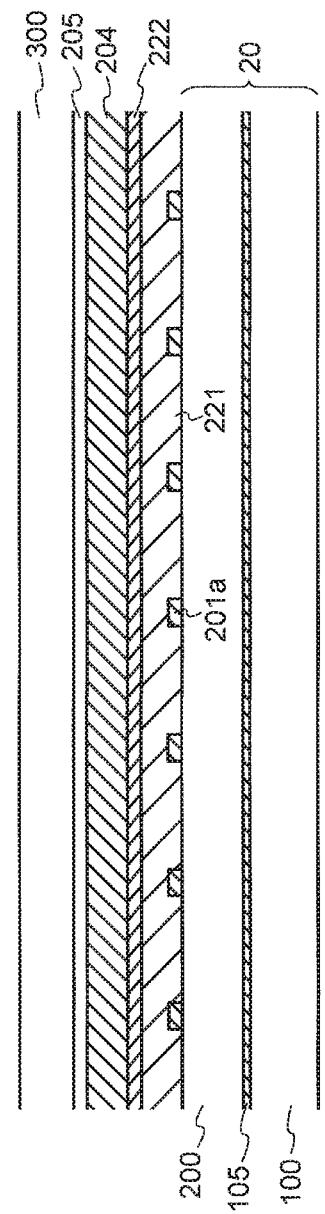

DISPLAY DEVICE

CROSS REFERENCE TO RELATED APPLICATIONS

This application is based upon and claims the benefit of priority from the prior Japanese Patent Application No. 2015-128632, filed on 26 Jun. 2015, the entire contents of which are incorporated herein by reference.

FIELD

The present invention relates to a display device including a touch panel, and specifically to a liquid crystal display device including a liquid crystal cell and a touch panel.

BACKGROUND

Conventionally, a liquid crystal display device having a touch panel provided on a front surface of a liquid crystal panel is known. In such a liquid crystal display device, the touch panel as an input sensor is provided on a GUI (Graphical User Interface) screen displayed on the liquid crystal cell, so that information may be input with a finger, a pen or the like.

A liquid crystal display device having a touch panel provided as an external element on a liquid crystal cell is increased in thickness by the thickness of the touch panel. Therefore, a liquid crystal display device including a touch panel provided inside a display cell has recently been proposed (Japanese Laid-Open Patent Publication No. 2011-70092).

SUMMARY

A display device in an embodiment according to the present invention is a display device including a touch panel. The display device includes a detection electrode of the touch panel, the detection electrode being provided on one surface of a display cell; a protective layer covering the detection electrode; and an optical film bonded to the protective layer, the optical film having an external shape smaller than that of the protective layer.

BRIEF EXPLANATION OF DRAWINGS

FIG. 1 shows a structure of a display device in embodiment 1 according to the present invention;

FIG. 2 shows a structure of the display device in embodiment 1 according to the present invention as seen from the side of a counter substrate;

FIG. 3 is a schematic cross-sectional view of the display device in embodiment 1 according to the present invention;

FIG. 4 schematically shows a protective layer of the display device in embodiment 1 according to the present invention;

FIG. 5 shows a terminal portion and the vicinity thereof of the display device in embodiment 1 according to the present invention;

FIG. 6 is a schematic cross-sectional view taken along one-dot chain line B-B in the plan view of FIG. 5;

FIG. 7A shows a production step of the display device in embodiment 1 according to the present invention;

FIG. 7B shows a production step of the display device in embodiment 1 according to the present invention;

FIG. 8A shows a production step of the display device in embodiment 1 according to the present invention;

FIG. 8B shows a production step of the display device in embodiment 1 according to the present invention;

FIG. 9 shows a structure of a display device in embodiment 2 according to the present invention as seen from the side of a counter substrate;

FIG. 10 is a schematic cross-sectional view of the display device in embodiment 2 according to the present invention;

FIG. 12 is a schematic cross-sectional view taken along one-dot chain line D-D in the plan view of FIG. 11;

FIG. 13A shows a production step of the display device in embodiment 2 according to the present invention;

FIG. 13B shows a production step of the display device in embodiment 2 according to the present invention;

FIG. 14A shows a production step of the display device in embodiment 2 according to the present invention; and FIG. 14B shows a production step of the display device in embodiment 2 according to the present invention.

DESCRIPTION OF EMBODIMENTS

Figure 11:
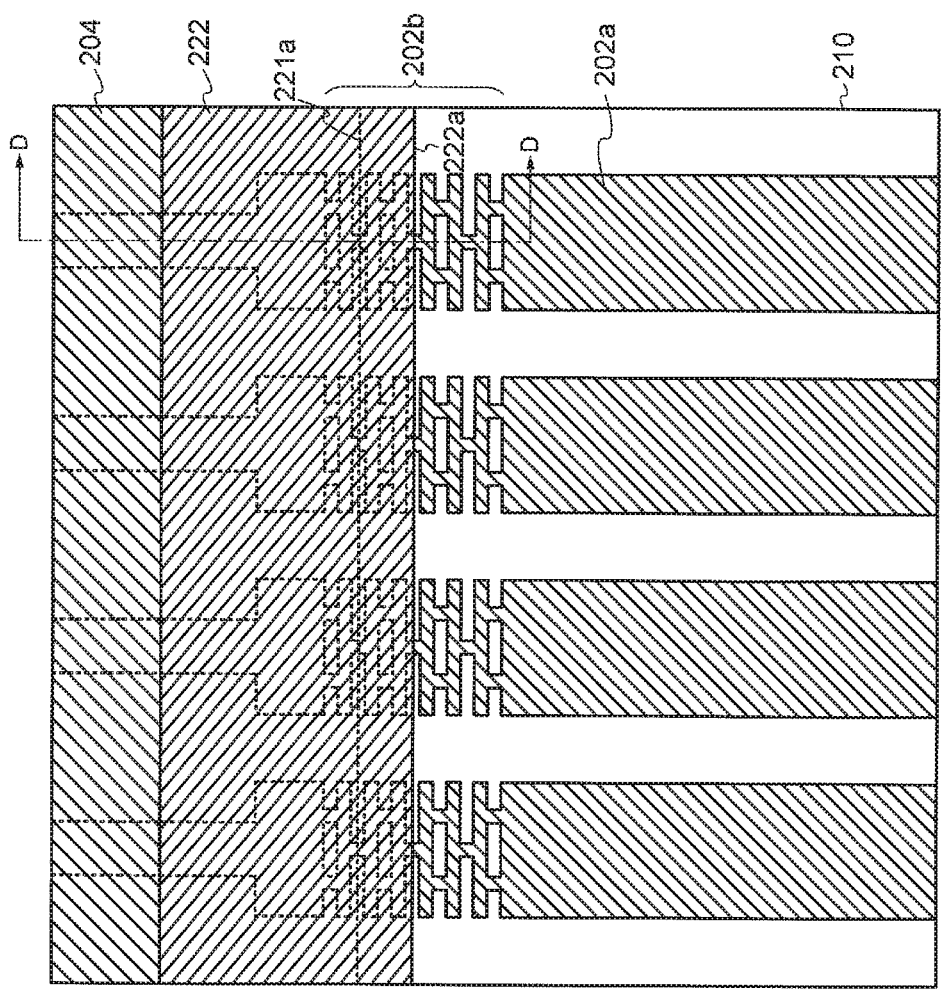
FIG. 11 shows a terminal portion and the vicinity thereof of the display device in embodiment 2 according to the present invention.

A display device of the type described in Japanese Laid-Open Patent Publication No. 2011-70092 has a problem that as the user keeps on operating the touch panel with his/her finger, charges are accumulated on the surface of the display cell, which easily charges the surface with electricity. In addition, when the surface of the display cell is charged with electricity, the touch panel is also charged with electricity, which may cause a malfunction.

An object of the present invention is to provide a display device including a touch panel, the display device having a function of being suppressed from being charged with electricity.

Hereinafter, embodiments of the present invention will be described with reference to the drawings. The present invention may be carried out in various forms without departing from the gist thereof, and is not to be construed as being limited to any of the following embodiments. In the drawings, components may be shown schematically regarding the width, thickness, shape and the like, instead of being shown in accordance with the actual sizes, for the sake of clearer illustration. The schematic drawings are merely exemplary and do not limit the interpretations of the present invention in any way. In the specification and the drawings, components that have substantially the same functions as those described before with reference to a previous drawing(s) bear the identical reference signs thereto, and detailed descriptions thereof may be omitted.

Embodiment 1

<Structure of the Display Device>

Hereinafter, a display device 10 including a touch panel in embodiment 1 will be described with reference to the drawings. FIG. 1 schematically shows a structure of the display device 10 including the touch panel in embodiment 1. The display device 10 includes an active matrix substrate 100, a counter substrate 200 and a cover member 300. A liquid crystal cell 20 includes the active matrix substrate 100, the counter substrate 200 and a liquid crystal layer 105 held between the active matrix substrate 100 and the counter substrate 200. The active matrix substrate 100 has a plurality of scanning electrodes 101 provided thereon. The plurality of scanning electrodes 101 are located in parallel, and form one of two electrode groups of a touch panel. The counter substrate 200 has a plurality of detection electrodes 201 provided thereon. The plurality of detection electrodes 201 are located in parallel, and form the other electrode group of the touch panel. The plurality of scanning electrodes 101 and the plurality of detection electrodes 201 cross each other to form a plurality of sensor portions. Thus, the touch panel includes the sensor portions located in a matrix.

Although not shown, the active matrix substrate 100 includes a display portion including a plurality of pixels located in a matrix. The display portion is formed by a known semiconductor production process. For example, each of the pixels includes a thin film transistor formed of a semiconductor thin film as a switching element. The switching element is controlled to be on or off, so that liquid crystal molecules in the liquid crystal layer 105 are controlled to be aligned in accordance with each pixel. A scanning signal and a data signal to be input to each pixel are transmitted from a driving circuit 102. The signals are input to, or output from, the driving circuit 102 via a terminal portion 103. The terminal portion 103 is electrically connected with a known FPC (Flexible Printed Circuit), so that a signal from an external device is transmitted to the driving circuit 102.

In this embodiment, the driving circuit 102 is formed of an IC chip provided as an external element. Alternatively, a driving circuit formed of a thin film transistor may be provided on the active matrix substrate 100 when the display portion is formed. In this case, a scanning line driving circuit, a data line driving circuit, or both thereof may be formed.

In this embodiment, the liquid crystal cell may be driven in any known operation mode. For example, the liquid crystal cell may be driven in either the VA (Vertical Alignment) mode or the IPS (In-Plain Switching) mode.

The counter substrate 200 has a terminal portion 202 provided thereon. The terminal portion 202 is usable to extract a detection signal from each of the detection electrodes 201. The terminal portion 202 is electrically connected with a known FPC (Flexible Printed Circuit), so that the detection signal is output to an external device. The counter substrate 200 may optionally have a color filter or a black matrix (light-blocking layer) provided on a surface thereof opposite to the surface on which the detection electrodes 201 are provided.

FIG. 2 is a plan view showing a structure of the display device 10 in embodiment 1 as seen from the side of the counter substrate 200. As shown in FIG. 2, each detection electrode 201 is provided as an assembly of a plurality of metal electrodes 201a. The plurality of detection electrodes 201 are respectively connected with a plurality of terminal electrodes 202a. The plurality of terminal electrodes 202a form the terminal portion 202. The detection electrodes 201 are covered with a protective layer 203 and a polarization plate 204 acting as an optical film. The protective layer 203 is provided to protect the detection electrodes 201 and the terminal portion 202 and will be described below in detail.

Since the detection electrodes 201 each include the plurality of metal electrodes 201a, the liquid crystal cell has a light transmittance higher than that in the case where the detection electrodes 201 are each a single metal electrode. This will be described in more detail. In the case where the detection electrodes 201 are each a single metal electrode (wide rectangular electrode), a light path is merely provided between adjacent detection electrodes 201. By contrast, in the case of the structure shown in FIG. 2, a light path is also provided between adjacent metal electrodes 201a. Therefore, the light transmittance of the entire liquid crystal cell increased.

FIG. 3 is a schematic cross-sectional view of the display device 10 shown in FIG. 2 taken along one-dot chain line A-A in FIG. 2. As shown in FIG. 3, the liquid crystal cell 20 of the display device 10 in embodiment 1 includes the active matrix substrate 100, the liquid crystal layer 105 and the counter substrate 200. In the display device 10 in this embodiment, the scanning electrodes 101 included in the touch panel are provided on the active matrix substrate 100, but are not shown in FIG. 3 for easier explanation. On a surface of the liquid crystal cell 20, the plurality of metal electrodes 201a are provided. In this embodiment, the metal electrodes 201a each have a stack structure in which an aluminum alloy film is held between thin films containing molybdenum. The metal electrodes 201a are not limited to having such a structure and may be formed of any other metal material(s).

The protective layer 203 is provided on the liquid crystal cell 20 so as to cover the metal electrodes 201a, and the polarization plate 204 is bonded to the protective layer 203. The cover member 300 is bonded to the polarization plate 204 with an adhesive layer 205. In this embodiment, the cover member 300 is formed of glass. The polarization plate 204, the adhesive 205 and the cover member 300 may each be formed of any known material. In this embodiment, the polarization plate 204 is provided as an optical film between the counter substrate 200 and the cover member 300. Any other optical film such as a phase plate or the like may be provided.

In the display device 10 in this embodiment, the adjacent metal electrodes 201a have a space therebetween. This improves the light transmittance of the liquid crystal cell 20. However, the space between the adjacent metal electrodes 201a is long, which may slow charge transfer at the surface of the liquid crystal cell 20. The display device 10 in this embodiment compensates for this by providing the protective layer 203 covering the metal electrodes 201a with electrical conductivity.

The protective layer 203 is substantially formed of a conductive substance and an insulating material. The protective layer 203 may be formed of, for example, an insulating material such as an acrylic or polyimide-based resin or a siloxane-based inorganic insulating material, and a conductive substance, for example, a conductive polymer incorporated into the insulating material. Therefore, the protective layer 203 acts as a conductive layer. The protective layer 203 may unavoidably contain impurities, which do not have any substantive influence.

The protective layer 203 having such a structure is entirely conductive. This allows charges provided to the space between the adjacent metal electrodes 201a to be quickly removed. The protective layer 203 also protects a surface of the metal electrodes 201a against steps performed later and thus prevents inconveniences such as, for example, line disconnection and deterioration of the appearance.

FIG. 4 is a schematic view mainly showing the protective layer 203 shown in FIG. 3. In this embodiment, an acrylic resin is used as the insulating material. As shown in FIG. 4, the acrylic resin adjusts the distribution of concentration of the conductive polymer in the protective layer 203. Specifically, the acrylic resin makes an adjustment such that a second resin layer 203b as an upper portion of the protective layer 203 has a higher concentration (content) of the conductive polymer than that of a first resin layer 203a as a lower portion of the protective layer 203. Herein, the concentration is concentration by mass. In other words, the conductive polymer is present in the upper portion of the resin layer (in the vicinity of a surface of the protective layer 203 on which the polarization plate 204 is located).

As described above, the display device 10 in this embodiment has such a structure that decreases the electrical conductivity of the first resin layer 203a to a minimum possible level. A reason for this is that if the electrical conductivity of the first resin layer 203a is too high, a signal may undesirably leak between the adjacent detection electrodes 201 via the first resin layer 203a. If this occurs, noise is increased when a position of the user's touch to the touch panel is detected. Therefore, the first resin layer 203a preferably has a sheet resistance of $1 \times 10^9$ to $1 \times 10^{12}$ (more preferably $1 \times 10^{10}$ to $1 \times 10^{12}$) [Ω/square] in order to have a minimum possible conductivity. The "sheet resistance" refers to the resistance caused when an electric current flows from an end to an opposite end of a square region of an optional size. The above-described value of the sheet resistance is the value of the sheet resistance at a bottom surface of the first resin layer 203a.

In this embodiment, the protective layer 203 has been described with the first resin layer 203a and the second resin layer 203b being distinguished from each other for the sake of explanation. It is sufficient that the protective layer 203 has a concentration distribution with which the concentration of the conductive substance (in this embodiment, the conductive polymer) is relatively higher in the upper portion than in the lower portion. In this embodiment, the protective layer 203 is divided into a plurality of layers having different concentrations of the conductive polymer. In a modification, the conductive polymer may be uniformly dispersed in the resin layer. In this case also, the sheet resistance is preferably $1 \times 10^9$ to $1 \times 10^{12}$ (more preferably $1 \times 10^{10}$ to $1 \times 10^{12}$) [Ω/square].

In the display device 10 in this embodiment, the protective layer 203 and the polarization plate 204 are independently provided. Therefore, the protective layer 203 may be designed to have any external shape regardless of the size of the polarization plate 204. FIG. 5 is a plan view showing the terminal portion 202 and the vicinity thereof of the display device 10 in embodiment 1. Specifically, FIG. 5 is an enlarged view of the area enclosed by dashed line 210 in the plan view of FIG. 2. FIG. 6 is a schematic cross-sectional view taken along one-dot chain line B-B in the plan view of FIG. 5.

As shown in FIG. 5 and FIG. 6, the protective layer 203 is extended to cover a part of the terminal electrodes 202a. By contrast, the polarization plate 204 does not reach the terminal electrodes 202a. In the display device 10, a part of the terminal electrodes 202a is meshed, and an end of the protective layer 203 is located on such a meshed portion 202b. With such a structure, the meshed portion 202b stops the expansion of the resin in a lateral direction, which provides an advantage that during the formation of the protective layer 203, the end thereof is controlled accurately. This allows the terminal electrodes 202a to be exposed in a large area and thus prevents defective contact in the terminal portion 202.

As described above, in the display device 10 in embodiment 1, the detection electrodes 201 of the touch panel each include the plurality of metal electrodes 201a. This structure decreases the resistance of the detection electrodes 201. Such a touch panel is usable for the display device 10 that is enlarged or of higher definition. The protective layer 203 also acting as an overcoat layer covers the metal electrodes 201a, and thus efficiently transfers charges while protecting the metal electrodes 201a. In addition, the protective layer 203 is electrically connected with the terminal portion 202.

Therefore, electrostatic charges are released outside quickly via the terminal portion 202. For these reasons, the display device 10 in this embodiment has a function of being suppressed from being charged with electricity.

<Method for Producing the Display Device>

Now, a method for producing the display device 10 in this embodiment will be described with reference to FIG. 7A, FIG. 7B, FIG. 8A and FIG. 8B. FIG. 7A, FIG. 7B, FIG. 8A and FIG. 8B each show a step of the method for producing the display device 10 in embodiment 1. For the sake of simplicity, the explanation will be made on one liquid crystal cell. In an actual production process, a plurality of liquid crystal cells 20 are formed at the same time on a large glass substrate.

First, as shown in FIG. 7A, the liquid crystal cell 20 is prepared. The liquid crystal cell 20 may be formed by a known liquid crystal cell production process. In this embodiment, the active matrix substrate 100 and the counter substrate 200 are formed, and the liquid crystal layer 105 is enclosed between the active matrix substrate 100 and the counter substrate 200 with a known seal material to form the liquid crystal cell 20. In this embodiment, a plurality of scanning electrode (scanning electrodes 101 shown in FIG. 1) forming one of the two electrode groups of the touch panel are formed on the active matrix substrate 100.

Next, as shown in FIG. 7B, the metal electrodes 201a are formed on one surface of the liquid crystal cell 20 (the surface that is to act as a display plane of the display device 10). In this embodiment, a metal layer having a stack structure in which an aluminum alloy film is held between thin films containing molybdenum is formed by sputtering, and is patterned by photolithography to form the metal electrodes 201a. It is preferable that the terminal electrodes 202a including the meshed portion 202b shown in FIG. 5 are formed at the same time.

On the surface of the metal electrodes 201a, a reflection-preventive layer may be provided. For example, a stack structure including three layers having different refractive indices may be formed on the surface of the metal electrodes 201a, so that the reflection at the surface of the metal electrodes 201a is decreased to improve the visual recognizability of the display device 10.

Next, as shown in FIG. 8A, the protective layer 203 is formed so as to cover the metal electrodes 201a. In this embodiment, the protective layer 203 is formed of a resin layer containing a conductive polymer. The conductive polymer is preferably a cationic polymer (e.g., cationic polymer having a quaternary ammonium salt group in a molecule). Known examples of the cationic polymer include benzalkonium chloride and benzethonium chloride. Such a cationic polymer charges the surface of the protective film 203 positive, and therefore prevents electrostatic adhesion of positively-charged foreign objects such as glass cullet generated when the liquid crystal cell is cut in a later step.

Examples of the usable conductive polymer include a polythiophene-based polymer, an acetylene-based polymer, and a polymer composite. A known example of the polythiophene-based polymer is PEDOT/PSS [Poly(3,4-ethylenedioxythiophene): Poly(styrenesulfonate)]. Examples of the usable resin include an acrylic resin, a polyimide-based resin, a polyamide-based resin, and the like. Instead of the resin, a siloxane-based inorganic insulating material may be used.

In this embodiment, a solution containing an acrylic resin and a cationic polymer incorporated as a conductive polymer into the acrylic resin is prepared in two types having different concentrations. First, a solution having a lower concentration (namely, a solution containing a lower content of the cationic polymer) is applied to one surface of the liquid crystal cell 20 on which the metal electrodes 201a are provided. Next, before the solution having a lower concentration is cured, a solution having a higher concentration is further applied to the one surface of the liquid crystal cell 20. Then, heat or light is provided to the solutions to cure the resin. As a result, as described above with reference to FIG. 4, the concentration (content) of the cationic polymer is made higher in the upper portion of the resin layer than in the lower portion.

In this embodiment, two types of solutions having different concentrations of the conductive polymer are prepared. Alternatively, any other method is usable. For example, a magnetic force or a potential difference may be provided to the resin before the resin is cured, so that the conductive polymer is transferred to increase the concentration thereof in the upper portion of the resin layer (in the portion on the surface side).

After the protective layer 203 is formed as described above, the active matrix substrate 100 and the counter substrate 200 are cut, so that a plurality of liquid crystal cells 20 integrally formed are separated into individual liquid crystal display cells 20. Since the protective layer 203 contains a cationic polymer as described above, glass cullet generated at the time of cutting is prevented from adhering to the liquid crystal cells 20.

Next, as shown in FIG. 8B, the polarization plate 204 is bonded to the protective layer 203, and a glass cover as the cover member 300 is bonded to the polarization plate 204 with the adhesive 205. Thus, the display device 10 described above with reference to FIG. 3 is produced.

In this embodiment, the liquid crystal cell 20 is described as the display cell. Alternatively, a display cell using an organic EL element or a light emitting diode may be used. Namely, the present invention is applicable to any display device in which one electrode group (detection electrodes) included in a touch panel is provided on one surface of the display cell.

Embodiment 2

<Structure of the Display Device>

Hereinafter, a display device 30 including a touch panel in embodiment 2 will be described with reference to the drawings. Unlike in the display device 10 in embodiment 1, in the display device 30 in embodiment 2, the protective layer has a stack structure of an insulating layer and a conductive layer. In this embodiment, points different from those in the display device 10 in embodiment 1 will be mainly described. Elements that are the same as those in the display device 10 in embodiment 1 will bear the same reference signs therewith, and descriptions thereof may be omitted.

FIG. 9 is a plan view showing a structure of the display device 30 in embodiment 2 as seen from the side of the counter substrate 200. The plurality of detection electrodes 201 provided on the counter substrate 200 are covered with an insulating layer 221 and a conductive layer 222 which form the protective layer and also with the polarization plate 204. The insulating layer 221 and the conductive layer 222 will be described below.

FIG. 10 is a schematic cross-sectional view of the display device 30 shown in FIG. 9 taken along one-dot chain line C-C in FIG. 9. As shown in FIG. 10, the insulating layer 221 and the conductive layer 222 are provided on the liquid crystal cell 20 so as to cover the metal electrodes 201a. In this embodiment, a stack structure including the insulating layer 221 and the conductive layer 222 acts as the protective layer. The polarization plate 204 is bonded to the conductive layer 222. The cover member 300 is bonded to the polarization plate 204 with the adhesive layer 205.

The insulating layer 221 may be formed of an insulating material such as an acrylic or polyimide-based resin or a siloxane-based inorganic insulating material. The conductive layer 222 may be formed of an insulating material such as an acrylic or polyimide-based resin or a siloxane-based inorganic insulating material and a conductive substance, for example, a conductive polymer incorporated into the insulating material.

With such a structure, the insulating layer 221 acts as an overcoat layer to protect the metal electrodes 201a, and the conductive layer 222 has a sufficient conductivity. Therefore, charges provided to a space between adjacent metal electrodes 201a are quickly removed. This protects the surface of the metal electrodes 201a against steps performed later and prevents inconveniences such as deterioration of the detection sensitivity caused by the charging, and the like. In this embodiment, the protective layer has a two-layer structure. Alternatively, the stack structure acting as the protective layer may have a larger number of layers. For example, the stack structure may have three or more layers including an insulating layer(s) and a conductive layer(s) stacked alternately.

The display device 30 in this embodiment has a feature in the positional relationship of the insulating layer 221, the conductive layer 222 and the polarization plate 204. As shown in FIG. 9, the polarization plate 204 has the smallest external shape (profile) among these three elements, the insulating layer 221 has an external shape larger than that of the polarization plate 204, and the conductive layer 222 has an external shape larger than that of the insulating layer 221. FIG. 11 is a plan view showing the terminal portion 202 and the vicinity thereof of the display device 30 in embodiment 2. Specifically, FIG. 11 is an enlarged view of the area enclosed by dashed line 210 in the plan view of FIG. 9. FIG. 12 is a schematic cross-sectional view taken along one-dot chain line D-D in the plan view of FIG. 11.

As shown in FIG. 11 and FIG. 12, the insulating layer 221 and the conductive layer 222 are extended to cover a part of the terminal electrodes 202a. By contrast, the polarization plate 204 does not reach the terminal electrodes 202a. In the display device 30, like in the display device 10 in embodiment 1, a part of the terminal electrodes 202a is meshed, and an end 221a of the insulating layer 221 and an end 222a of the conductive layer 222 are located on such a meshed portion 202b. With such a structure, as described above in embodiment 1, there is an advantage that during the formation of the insulating layer 221 and the conductive layer 222, the ends thereof are controlled accurately.

In the display device 30 in this embodiment, the external shape of the conductive layer 222 may be larger than that of the insulating layer 221. Therefore, the end 221a of the insulating layer 221 is covered with the conductive layer 222. The conductive layer 222 may be in direct contact with the terminal electrodes 202a. In this case, charges provided to the surface of the liquid crystal cell 20 are transferred to the terminal electrodes 202a quickly via the conductive layer 222, which prevents the liquid crystal cell 20 more efficiently from being charged with electricity.

In FIG. 9, all the four sides of the conductive layer 222 are located outer to the insulating layer 221. Alternatively, the conductive layer 222 may extend outer to the insulating layer 221 only on the side on which the conductive layer 222 is in contact with the terminal portion 202. Still alternatively, the conductive layer 222 may have a protrusion part, which is in contact with the terminal portion 202.

As described above, in the display device 30 in embodiment 2, the detection electrodes 201 of the touch panel each include the plurality of metal electrodes 201a. This structure decreases the resistance of the detection electrodes 201. Such a touch panel is usable for the display device 30 that is enlarged or of higher definition. The protective layer (stack structure including the insulating layer 221 and the conductive layer 222) also acting as an overcoat layer covers the metal electrodes 201a, and thus efficiently transfers charges while protecting the metal electrodes 201a. In addition, the conductive layer 222 is electrically connected with the terminal portion 202. Therefore, electrostatic charges are released outside quickly via the terminal portion 202. For these reasons, the display device 30 in this embodiment is suppressed from being charged with electricity.

<Method for Producing the Display Device>

Now, a method for producing the display device 30 in this embodiment will be described with reference to FIG. 13A, FIG. 13B, FIG. 14A and FIG. 14B. FIG. 13A, FIG. 13B, FIG. 14A and FIG. 14B each show a step of the method for producing the display device 30 in embodiment 2. In this embodiment also, the explanation will be made on one liquid crystal cell for the sake of simplicity. In an actual production process, a plurality of liquid crystal cells 20 are formed at the same time on a large glass substrate.

First, as shown in FIG. 13A, the liquid crystal cell 20 is prepared, and the metal electrodes 201a are formed on one surface of the liquid crystal cell 20. The liquid crystal cell 20 may be formed by a known liquid crystal cell production process. In this embodiment, like in embodiment 1 regarding the display device 10, the plurality of scanning electrode (scanning electrodes 101 shown in FIG. 1) forming one of the two electrode groups of the touch panel are formed on the active matrix substrate 100.

Next, as shown in FIG. 13B, the insulating layer 221 is formed so as to cover the metal electrodes 201a. In this embodiment, the insulating layer 221 is formed of a thermosetting acrylic resin. In general, a thermosetting resin has a good adhesion to glass. Therefore, it is preferable to use a thermosetting resin in order to increase the adhesion to the counter substrate 200. The insulating layer 221 may be formed of a photocurable resin which has a sufficient level of adhesion to the counter substrate 200.

Next, as shown in FIG. 14A, the conductive layer 222 is formed so as to cover the insulating layer 221. In this embodiment, the conductive layer 222 is formed of a resin material containing a conductive polymer. Examples of the usable conductive polymer are substantially the same as those usable for the protective layer 203 described in embodiment 1. Unlike in embodiment 1, there is no limitation on the resistance of the conductive layer 222. Therefore, the concentration of the conductive polymer may be increased to decrease the resistance of the conductive layer 222. In this embodiment, the resin material used for the conductive layer 222 is a photocurable acrylic resin. In general, a photocurable resin is harder than a thermosetting resin and thus is preferable for the conductive layer 222, which is a part of the protective layer acting against steps performed later.

In this embodiment, the insulating layer 221 and the conductive layer 222 are formed separately. The method for forming the stack structure is not limited to this. For example, in the case where the insulating layer 221 and the conductive layer 222 are formed of resins containing different main components, a mixed solution of such resins may be applied and self phase separation may be caused to realize a two-layer structure.

As described above, the display device 30 in this embodiment includes the stack structure of the insulating layer 221 and the conductive layer 222 as the protective layer. Thus, the insulating layer 221 acts as an overcoat layer, whereas the conductive layer 222 acts as a layer suppressing the display device 30 from being charged with electricity.

Especially because the insulating layer 221 is formed of a thermosetting resin and the conductive layer 222 is formed of a photocurable resin, the properties of these resins opposite to each other are well utilized. In general, a thermosetting resin has a higher adhesion to glass than a photocurable resin, but cannot be made very hard. The hardness may be increased by raising the curing temperature. However, in the case where a thermosetting resin is used for a liquid crystal cell as in this embodiment, the temperature of the thermosetting resin cannot be very high for the reason of the heat resistance of the liquid crystal material. In such a situation, in this embodiment, a photocurable resin, which is less adhesive to glass than a thermosetting resin but is made hard easily, is used for the conductive layer 222. In this manner, the function of protecting the liquid crystal cell 20 against steps performed later (cutting of the cell, washing of the cell, bonding of the polarization plate to the cell, etc.) is improved. In addition, a thermosetting resin is used for the insulating layer 221, so that the metal electrodes 201a are sufficiently buried in the thermosetting resin. This decreases the amount of the photocurable resin to be used, which provides an advantage that the liquid crystal layer 105 does not need to be irradiated with an excessive amount of light (e.g., ultraviolet light).

After the insulating layer 221 and the conductive layer 222 acting as the protective layer are formed as described above, the active matrix substrate 100 and the counter substrate 200 are cut, so that a plurality of liquid crystal cells 20 integrally formed are separated into individual liquid crystal display cells 20.

Next, as shown in FIG. 14B, the polarization plate 204 is bonded to the conductive layer 222, and a glass cover as the cover member 300 is bonded to the polarization plate 204 with the adhesive 205. Thus, the display device 30 described above with reference to FIG. 10 is produced.

Display devices described above in embodiments according to the present invention may have an element added thereto, or deleted therefrom, or may be changed in design optionally by a person of ordinary skill in the art. Methods for producing a display device described above in embodiments according to the present invention may have a step added thereto, or deleted therefrom, or may be changed in a condition optionally by a person of ordinary skill in the art. Such display devices and methods for producing the same are encompassed in the scope of the present invention as long as including the gist of the present invention.

Even functions and effects that are different from those provided by the above-described embodiments but are obvious from the description of this specification or are easily expectable by a person of ordinary skill in the art are naturally construed as being provided by the present invention.

The invention claimed is:

1. A display device including a touch panel, comprising:
   a detection electrode of the touch panel, the detection electrode being provided on one surface of a display cell;
   a protective layer covering the detection electrode; and
   an optical film bonded to the protective layer, the optical film having an external shape smaller than that of the protective layer, wherein
   the detection electrode is connected with a terminal electrode, a part of the terminal electrode having a meshed portion,
   an end of the protective layer is in contact with the meshed portion,
   the protective layer is extended to cover only a part of the meshed portion, and
   the meshed portion stops the expansion of the protective layer.

2. The display device according to claim 1, wherein the protective layer is substantially formed of a conductive polymer and an insulating material.

3. The display device according to claim 2, wherein the protective layer has a higher concentration of the conductive polymer in an upper portion thereof than in a lower portion thereof.

4. The display device according to claim 2, wherein the protective layer has a sheet resistance of $1\times10^9$ to $1\times10^{12}$ [$\Omega$/square].

5. The display device according to claim 1, wherein the protective layer includes an insulating layer covering the detection electrode and a conductive layer covering the insulating layer.

6. The display device according to claim 5, wherein:
   the insulating layer is formed of a first resin; and
   the conductive layer is formed of a second resin containing a conductive polymer.

7. The display device according to claim 5, wherein the conductive layer has an external shape larger than that of the insulating layer.

* * * * *